(No Model.)
G. P. & L. J. LEE.
Fruit Drier.
No. 234,412. Patented Nov. 16, 1880.
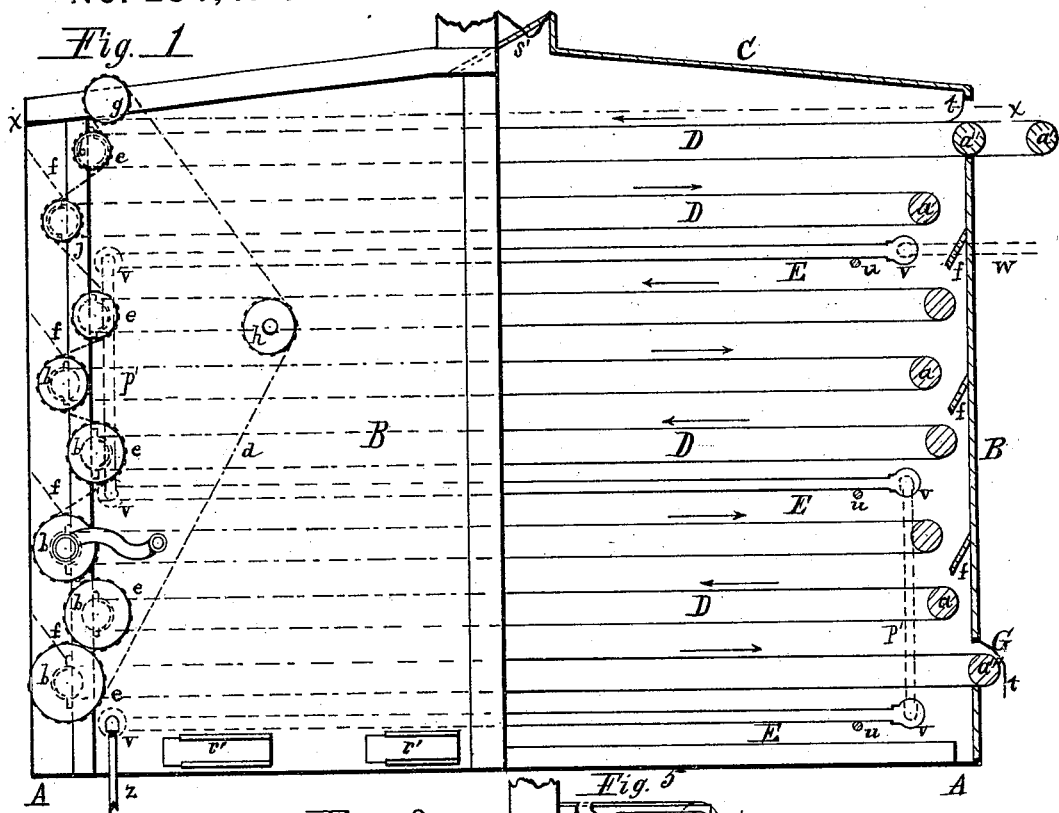
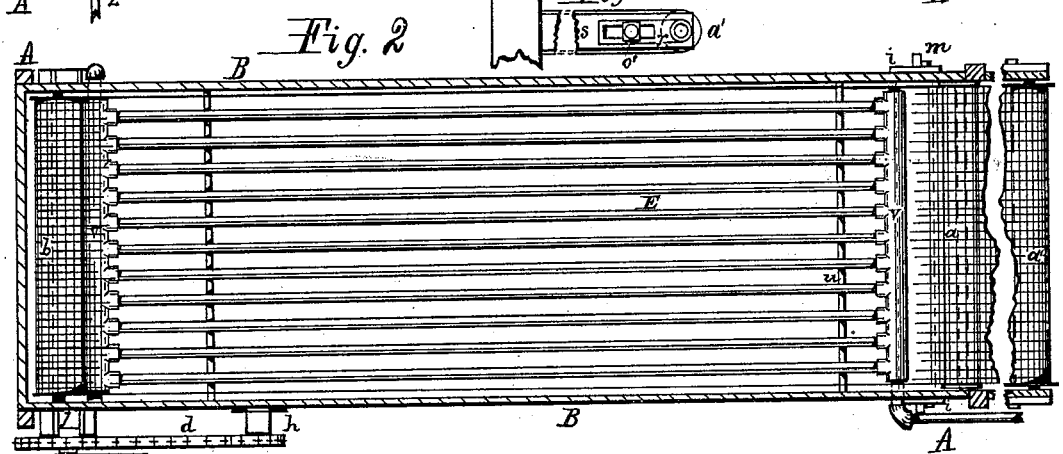
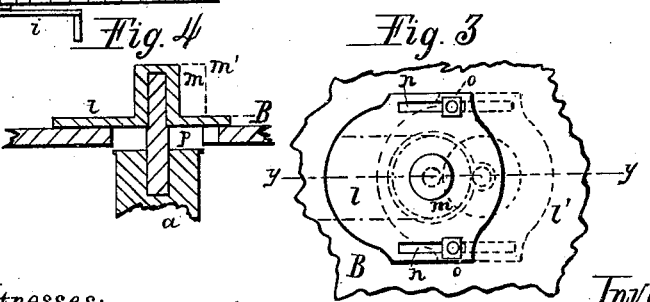
Witnesses:
W. M. Rebasz Jr.
H. G. Phillips
Inventors:
Geo. P. Lee,
Leverett J. Lee, by G. B. Selden,
atty.

UNITED STATES PATENT OFFICE.

GEORGE P. LEE AND LEVERETT J. LEE, OF GREECE, NEW YORK.

FRUIT-DRIER.

SPECIFICATION forming part of Letters Patent No. 234,412, dated November 16, 1880.

Application filed June 17, 1880. (No model.)

*To all whom it may concern:*

Be it known that we, GEORGE P. LEE and LEVERETT J. LEE, residents of the town of Greece, Monroe county, New York, have jointly invented certain Improvements in Fruit-Driers, of which the following is a specification, reference being had to the annexed drawings, in which—

Figure 1 is a side elevation, partly in section, of our improved fruit-drier. Fig. 2 is a horizontal section on the line $x\ x$, Fig. 1, showing the parts below that line. Fig. 3 is a side elevation of the adjustable boxes which carry the ends of the rollers. Fig. 4 is a horizontal section of the same on the line $y\ y$, Fig. 3. Fig. 5 is a side view of the bracket which supports the roller $a'$.

Our invention relates to an improved fruit-drier, in which the fruit is dried while passing through a drying-chamber on a series of endless wire-cloth belts placed one above the other, and arranged to deliver the fruit from one to the other, each lower belt having a slower motion imparted to it than that given to the one next above it.

Our invention also consists in the combination, with the series of endless belts arranged as just mentioned, of a series of steam-heating pipes arranged between the belts and having a steam-circulation from above downward, for the purpose of subjecting the greenest fruit to the hottest steam; and it also consists in the mechanical construction and arrangement of the apparatus, as hereinafter more fully pointed out.

Our improved fruit-drier is represented in the accompanying drawings, in which A A is the frame of the machine; B, the siding; C, the top or roof; D, the belts, and E the steam-pipes.

In the construction of our improved fruit-drier we form an inclosure or drying-room, of a size adapted to the quantity of fruit to be operated upon, by constructing a suitable frame-work, A, and attaching sides, ends, and roof thereto, as represented in the accompanying drawings.

Within the drying-chamber and at each end thereof are placed a series of horizontal rollers, $a\ a\ a\ b\ b\ b$, over which pass the endless wire-cloth belts D D. The ends of the rollers are supported in suitable boxes attached to the siding or frame of the machine.

Motion is transmitted to the series of rollers $b\ b\ b$ by means of a chain, $d$, running over pulleys $e\ e\ e$ on the roller-journals, in such manner that the upper parts of the belts D D travel in reverse directions, as represented by the arrows in Fig. 1, so that the fruit to be dried, being placed on the upper belt between the side of the machine and the roller $a'$, is carried by it to the opposite end of the drying-chamber and there delivered to the next lower belt, by which it is brought back to the right-hand end of the machine, to be there delivered to the next succeeding belt, and so on from belt to belt until it is finally discharged from the machine, fully dried, by the lowest belt, at G, Fig. 1.

Suitable chutes or guide-boards $f\ f\ f$, placed across the machine below the ends of the belts in the proper positions, insure the delivery of the fruit from one belt to the next lower belt.

The rollers are so placed that each belt is somewhat shorter than the next lower belt at one end or the other, so as to effect the delivery of the fruit from belt to belt as it passes downward through the machine. The motion of each belt is slightly slower than that of the next upper belt, the pinions on the rollers $b\ b\ b$ being made larger from above downward, so that the lower belt travels two or three times as fast as the upper ones.

A chain, $d$, running around the pinions, serves to revolve each alternate shaft $b$ in the opposite direction to that in which its neighbor turns, so as to give motion in the proper directions to the belts D D D. The chain is carried around corner pulleys, $g\ h$, and a crank, $i$, is attached to the shaft of one of the rollers $b\ b\ b$, by which the machine is operated.

It is evident that the proper relative motions can be given to the belts D D D by means of a train of gears with intermediates between the shafts where the pinions are small; but we prefer the chain, as herein shown.

The journals of the rollers $b\ b\ b$ are supported by boxes secured to an upright, $j$, on the side of the machine and forming part of the frame thereof.

The journals of the rollers $a\ a\ a$ revolve in boxes $m$, Figs. 2 and 4, which are made adjustable lengthwise of the belts D D, for the purpose of regulating their tension.

An opening, p, Fig. 4, is made through the side B of the machine for the purpose of permitting the removal of the roller, and this opening is closed by the box m, which is provided with a flange, l, of sufficient width to cover the opening p in whatever position the box and roller may be placed.

The flange l is provided with horizontal slots n n, Fig. 3, through which pass bolts o o, by which the box is secured to the siding. These slots permit the horizontal adjustment of the box m and rollers, so that the tension of the belt D may be regulated thereby. Each of the series of rollers a a is provided with these adjustable boxes at each end thereof.

The roller a' is made adjustable by means of a sliding box, r, attached to the bracket s by means of the bolt o', Fig. 5.

The position of the box m when moved to the right as far as the slots n n will permit is shown in dotted lines m' l', Figs. 3 and 4.

The journals of the roller a'', the function of which is to support the belt D and to close the opening into the machine between the upper and lower portions of that belt, so that air cannot enter or escape through it, need not be made adjustable.

The boxes of the roller a''', which carries the right-hand end of the lower belt, and also operates to prevent the passage of air, may be made adjustable by slightly changing the form of the flange l.

The openings through the side of the machine above the upper and lower belts are closed by a cloth or curtain, t t, attached to the side and hanging down over the fruit, as it passes in and out of the machine, so as to prevent as much as possible the escape or entrance of air at these points.

The series of steam-pipes E E are supported by iron rods u u u, Fig. 1, passing across the machine. The pipes are connected at each end with suitable distributing-pipes v v, by which steam is introduced into them. Steam is introduced into the upper row of pipes by means of the supply-pipe w, and discharged from the lowest row through the pipe z, the object being to subject the fruit, when first introduced into the machine, to the greatest degree of heat. Steam passes from each upper row of pipes to the next lower row through pipes p' p'.

Provision is made for the introduction of air into the lower part of the drying-chamber by sliding doors r' r' at the lower part of the machine.

In Fig. 2 the wire-cloth belts are broken away, so as to show the steam-heating pipes. The ends of the wire-cloth belts may be connected together by soldering, sewing with wire, or by hooks.

A valve, s', for regulating the escape of air from the drying-chamber, may be placed in the top thereof.

We are aware that steam-heating pipes have been previously used to heat a volume of air on its introduction into a drying-chamber containing a series of horizontal belts, and such arrangement we do not claim, as it is essential to the proper operation of our invention for the purpose of drying fruit that the steam-heating pipes should be located between the fruit-carrying belts, and that the steam should be introduced into said pipes at their upper ends, so that the greenest fruit on the uppermost belts shall be subjected to the greatest degree of heat.

We do not claim anything shown or described in the patent of Miller, No. 44,260, or of Wilson and Catlin, No. 215,191.

We claim—

1. In combination with a series of steam-heating pipes, E E E, the endless wire-cloth belts D D D, arranged to deliver the fruit from one to the other, and having differential motions imparted to them by means of pinions e e e, of differing sizes, and chain d, so that the lower belts move slower than those above them, substantially as described.

2. The combination of the series of belts D D D, rollers a a a b b b, roller a', located outside of the machine, and rollers a'' a''' in the openings through which the upper and lower belts pass in the side of the machine, substantially as described.

3. In a fruit-drying chamber, a series of endless wire-cloth belts, D D D, passing over rollers at either end thereof, arranged to deliver the fruit from one belt to the next lower, and having differential motions imparted to them by pinions e e e and chain d, substantially as described.

GEO. P. LEE.
LEVERETT J. LEE.

Witnesses:
GEO. B. SELDEN,
H. G. PHILLIPS.